United States Patent [19]

Holt et al.

[11] 3,870,948

[45] Mar. 11, 1975

[54] PROXIMITY CIRCUIT WITH ACTIVE DEVICE FEEDBACK

[75] Inventors: Frederick R. Holt, Cleveland; Noah Flueckiger, Solon, both of Ohio

[73] Assignee: Acme-Cleveland Corporation, Cleveland, Ohio

[22] Filed: Sept. 5, 1972

[21] Appl. No.: 286,277

[52] U.S. Cl. .................. 324/34 PS, 324/41, 331/65, 340/258 C

[51] Int. Cl. .............................................. G01r 33/00

[58] Field of Search ........ 324/34 D, 34 PS, 340, 41, 324/40; 331/65; 340/258 R, 258 C, 38 L

[56] References Cited

UNITED STATES PATENTS

| | | | |
|---|---|---|---|
| 2,895,108 | 7/1959 | Haddad et al. | 324/41 |
| 3,469,204 | 9/1969 | Magyar et al. | 331/65 |
| 3,609,580 | 9/1971 | Thompson et al. | 331/65 |
| 3,747,011 | 7/1973 | Buck | 331/65 |

FOREIGN PATENTS OR APPLICATIONS

| | | | |
|---|---|---|---|
| 1,951,137 | 5/1971 | Germany | 324/41 |

*Primary Examiner*—Robert J. Corcoran
*Attorney, Agent, or Firm*—Woodling, Krost, Granger & Rust

[57] ABSTRACT

A proximity switch circuit is disclosed which is responsive to the distance between a proximity probe and a conductive or inductive target. An amplifier is connected as an oscillator in a bridge circuit with the probe as one arm of the bridge and variations of distance between the probe and the target change the balance point of the bridge to change oscillation output. If the target is close, the oscillator will tend to cease and this is detected by an auxiliary detector to partly turn on an auxiliary energy pump which sustains oscillation output of the amplifier. This output is fed to a window detector which determines if the output is between lower and upper threshold values, and if it is, then there is an output from an output circuit. If the detector circuit determines that the amplifier output is below the lower threshold or greater than the upper threshold, then there is no output. This establishes a fail-safe operating condition by terminating the output should the oscillator cease to function for reasons such as short-circuiting or open-circuiting of the proximity probe.

19 Claims, 4 Drawing Figures

PROXIMITY CIRCUIT WITH ACTIVE DEVICE FEEDBACK

BACKGROUND OF THE INVENTION

Proximity switches have been used to count metal containers moving along a conveyor line, for example, and it has been contemplated that such proximity switches could be used to detect the limit of travel of a slide of a machine tool. The prior art has used electromechanical limit switches to limit or control the movement of machine tool slides. It has been proposed that a proximity switch could be used to replace the electromechanical switch because of possible failure in the mechanical limit switch which might allow the slide to overtravel and damage the entire expensive machine tool. The proximity switches known to the inventors have not been sufficiently fail-safe to permit such substitution. If one is using a proximity switch to count metal containers moving along a conveyor line, it may not be of much importance whether one counts ten thousand or whether one misses two of them and counts only 9,998. However, if the proximity switch is to limit and to control the reversing of a machine tool slide, then failure of the proximity switch could mean that the slide would crash into the workpiece, the tooling or other parts of the machine tool and cause extensive damage, or even worse might injure personnel.

The proximity switch probe is an extremely likely element to be damaged. It is often a small cylindrical housing mounted on the end of a flexible cable which connects to the control circuitry. A workman might drop a wrench or a workpiece on such proximity probe or tooling could damage the probe during set-up of the machine tool or coolant or lubricant could seep into the housing of the proximity probe. Also the flexible cable leading to such probe is subject to being damaged by the above or other eventualities. Under such condition, the probe which, for example, might contain an inductive coil, could have this coil either short-circuited or open-circuited. In proximity switch circuits known to the inventors, this creates a non-fail-safe condition because it indicates that all parts are performing satisfactory whereas the opposite is the case and the machine should be shut down.

Accordingly, an object of the invention is to provide a proximity switch circuit which obviates the above-mentioned disadvantages.

Another object of the invention is to provide a proximity switch circuit which indicates a GO condition if the target is close to the probe but indicates a NO GO condition if the target is away from the probe or if the probe or oscillator has a malfunction.

Another object of the invention is to provide a proximity switch circuit with a window detector to indicate a go condition of an output only if the target is close and hence within the window but not if the target is away from the probe or if the oscillator or probe is damaged or malfunctioning.

Another object of the invention is to provide a proximity switch circuit wherein an auxiliary energy pump is provided as controlled by an auxiliary to maintain low levels of oscillation during those times that a target is close to the proximity probe.

SUMMARY OF THE INVENTION

The invention may be incorporated in a proximity switch comprising in combination an amplifier having an output and an input, a proximity probe, feedback means connecting said amplifier output to said amplifier input, means connecting said probe as part of said feedback means to produce a signal at said input of said amplifier which is variable in accordance with the distance from said probe to a conductive target, an auxiliary device, means connecting said auxiliary device as part of said feedback means to vary said amplifier input, and detector means connected to detect reduced output of said amplifier and connected to control said auxiliary device to increase the output of said amplifier.

Other objects and a fuller understanding of the invention may be had by referring to the following description and claims, taken in conjunction with the accompanying drawing.

DESCRIPTION OF THE PREFERRED EMBODIMENT

Figure 1:
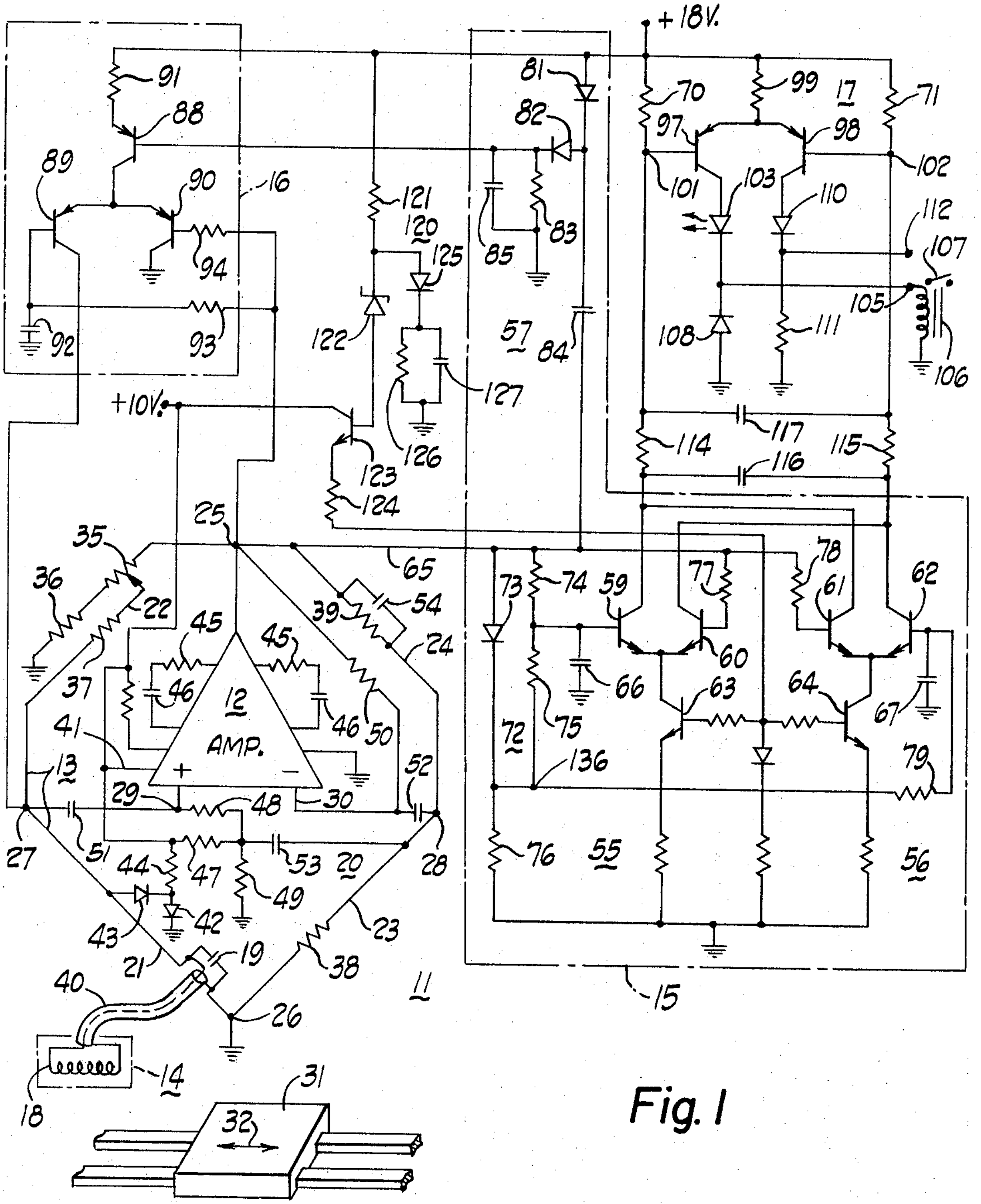
FIG. 1 is a schematic diagram of a circuit embodying the invention.

FIG. 1 is a schematic diagram illustrating the preferred form of the invention. This FIG. 1 shows a proximity switch circuit 11 which includes generally an amplifier 12, feedback means 13, a proximity probe 14, detector means 15, an auxiliary device 16, and output means 17. The amplifier 12 is connected as an oscillator with the frequency of oscillation controlled by the frequency of a resonant circuit consisting of inductive means 18 and capacitive means 19. The proximity probe is connected as a part of the inductive and capacitive means and may be the inductive coil 18 which is influenced by its proximity to a conductive target. In a well-known manner, as the distance to a conductive target decreases, the increasing eddy current losses in the conductive target lower the Q of the parallel resonant circuit to change the total impedance across such resonant circuit. The feedback means 13 is included in a bridge circuit 20. This bridge circuit performs double duty and is the generator or oscillator in combination with the amplifier 12. The bridge circuit 20 has first through fourth arms 21–24, respectively. The feedback means 13 may be considered as having negative feedback means and positive feedback means to the amplifier 12. The negative feedback means includes the bridge arms 23 and 24 and the positive feedback means includes the bridge arms 21 and 22. The bridge 20 has first and second input terminals 25 and 26, respectively, with terminal 26 grounded, and has first and second output terminals 27 and 28, respectively. The amplifier 12 has an output connected to the bridge first input terminal 25. Amplifier 12 also has positive 29 and negative 30 input terminals which also are known as non-inverting and inverting input terminals, respectively. The positive input terminal 29 is connected to the bridge first output terminal 27 which is at the junction of the first and second bridge arms 21 and 22. Terminal 29 is connected to terminal 27 via a capacitor 51. The amplifier negative input terminal 30 is connected via a capacitor 52 to bridge second output terminal 28 which is at the junction of the bridge arms 23 and 24. A conductive target is represented by the block 31 and the arrow 32 indicates that it may move in a path in proximity to the proximity probe 14. The target 31 is shown removed from the vicinity of the probe 14. In this condition the parallel resonant circuit 16–17 will have a high Q and a high impedance.

The second bridge arm 22 is shown as including a potentiometer 35 and resistors 36 and 37. The bridge third and fourth arms 23 and 24 include fixed resistors 38 and 39, respectively. The bridge first arm 21 includes the probe 14 as a part of the inductive and capacitive means 18–19 and the probe may be mounted inside a housing represented by the dotted rectangle 14 and connected by a coaxial cable 40. The capacitive means 19 may be provided on the printed circuit board, and the inner end of the coaxial cable 40 may be flexible to permit mounting of the probe 14 in any suitable location.

A positive DC operating voltage, e. g., plus 10 volts, is supplied to an operating voltage input terminal 41 of the amplifier 12 and in one practical circuit constructed to this invention, an RCA operational amplifier CA3029 was used satisfactorily. Diodes 42 and 43 are biased by a resistor 44 to this positive DC source and provide protection against over-voltages on the probe 14. Resistors 45 and capacitors 46 and 54 are used for frequency compensation and connected to frequency compensation terminals of the amplifier 12.

Resistors 47–50 are large value resistors which set the DC operating level of the amplifier 12. Capacitors 51–54 are small value capacitors which pass the AC or oscillation frequency signal to the amplifier 12.

The output of the amplifier 12 is supplied to the detector means 15 and through it to the output means 17. The detector means 15 includes generally a first detector 55, a second detector 56 and an auxiliary detector 57. The first detector 55 detects a lower threshold operating conditon and the second detector 56 detects an upper threshold operating condition and together establish a window detector. The first detector 55 includes a pair of differential transistors 59 and 60 and the second detector 56 includes a pair of differential transistors 61 and 62. Detector 55 includes a transistor 63 connected as a constant current source and a transistor 64 connected as a constant current source is a part of detector 56. The oscillator frequency in one circuit constructed in accordance with the invention was in the range of 100–200 KHz. The detector means 15 is connected by a conductor 65 to the amplifier output terminal 25, but the bases of transistors 59 and 62 are generally bypassed to ground at oscillator frequencies by the bypass capacitors 66 and 67.

Operating voltage such as 18 volts positive DC is supplied to the detector means 15 and to the output means 17. Detector load resistors 70 and 71 are loads for the detectors 55 and 56 and are a part of the output means 17.

Bias mens 72 is provided for the detectors 55 and 56 to establish the aforementioned lower and upper thresholds. This bias means includes a diode 73 and resistors 74–76. Also, resistors 77–79 are a part of the bias means 72.

The auxiliary detector 57 includes diodes 81 and 82 connected in series with a resistor 83 between the positive DC supply and ground 26.

This detector acts as a peak-to-peak AC detector and is supplied with oscillation frequency energy from conductor 65 via a coupling capacitor 84. A filter capacitor 85 is connected across the resistor 83 to filter the output of this detector as it is applied to the auxiliary device 16.

The auxiliary device 16 is an active device and may be termed an auxiliary energy pump. It includes a transistor 88 plus a differential pair of transistors 89, 90. The fixed bias of diodes 81 and 82 establish transistor 88 as a constant current generator, or in this case as a variable rate constant current generator. The emitter of transistor 88 is connected by a resistor 91 to the positive DC supply. The collector of transistor 90 is grounded and the base of transistor 89 is grounded through a bypass capacitor 92 which bypasses to ground the oscillator frequency. The output of the amplifier 12 at terminal 25 is coupled to the transistor pair 89, 90 through resistors 93, 94.

The output means 17 includes a differential pair of transistors 97, 98 with the emitters thereof interconnected and connected by a resistor 99 to the DC supply voltage. The bases of the transistors 97 and 98 are connected to terminals 101 and 102 at the lower end of the detector load resistors 70 and 71, respectively. The collector of transistor 97 is connected through a light emitting diode 103, as an output indicator, to a main output terminal 105. An optional relay 106 having contacts 107 is shown connected to this main output terminal 105. A diode 108 is connected to conduct current from ground to the main output terminal 105 to protect the transistor 97 for inductive loads on output terminal 105 for example the relay 106.

A diode 110 and load resistor 111 are connected in series between the collector of transistor 98 and ground. A secondary output terminal 112 is connected at the junction of the diode 110 and resistor 111. A low pass filter including resistors 114, 115 and capacitors 116, 117 is connected between the transistors 59 and 62 and the detector load resistors 70, 71.

Power is supplied to the first and secnd detectors 55 and 56 by a time delay power supply circuit 120. Such power supply 120 supplies operating voltage to the constant current generators 63 and 64 only after a time delay which assures that the bridge circuit 20 and amplifier 12 have settled down to steady state conditions after initial energization of the proximity switch circuit 11. This power supply 120 includes a resistor 121 and a breakdown diode 122 connected in series to the 18-volt DC supply and to the base of a transistor 123. The collector of this transistor is connected to the +10 volt DC supply and the emitter of transistor 123 is connected through a resistor 124 to the interconnection of the base resistors of transistors 63 and 64. A diode 125 and resistor 126 are connected in series from the lower end of resistor 121 to ground. A large capacitor 127 is connected in parallel with resistor 126.

OPERATION

In electronics, the measurement of small changes in parameters is best handled by a bridge circuit operating much in the same way as the familiar 2-pan beam balance used in the chemistry lab. In this way, the number of variables may be drastically reduced and active components may vary greatly without affecting the system's operation in the least. Finally, the bridge detector 12 can be made to do double duty by acting as the RF generator or oscillator. Thus, both great stability and simplicity may be achieved at once. Further, the system is subject to exact analysis, from which both performance and production controls can be predicted. For the purposes of analysis, we wish to examine the operation of the amplifier 12 and bridge 20 with the entire means 16 removed. It will become later apparent that this is permissible. For analysis of the present system, one side of the bridge 20 may first be considered as consisting of two fixed resistors $R_{23}$ and $R_{24}$, which also can be considered as a negative feedback loop around the amplifier 12. $\beta$ is defined as:

$$\beta = (R_{23}/R_{23} + R_{24}) \quad (1)$$

The amplification A of amplifier 12 is in the order of 1,000 or 10,000 yet $\beta$ in the preferred embodiment is large; that is, between 0.1 and 1.0, and preferably between 0.2 and 0.4. The other side of the bridge consists of 21 and 22. 22 is considered as a resistor, the effective value of which may be adjusted, and for analysis will be called $R_{22}$. 21 consists of an inductor 18 of value L, together with a capacitor 19, the value of which includes distributed and cable capacitances. The total value of 19 will be called C. The inductor 18 and capacitor 19 are connected and analyzed as a parallel resonant circuit. Since the inductor 18 has inherent loss, all losses in the resulting arm 21 will be considered as an equivalent ohmic resistor in series with 18 and called $R_s$. The characteristics of the bridge arm 21 are analyzed at the frequency of resonance.

From the viewpoint of the resonant circuit, the addition of $R_{22}$ causes the input impedance of the amplifier 12 to appear negative, and when this negative resistance is sufficiently small, the losses due to $R_s$ are made up for, and the circuit oscillates. It should be noted that the above remarks relate to the analytic method used and do not restrict the circuit itself. Other methods of analysis (Bode's method, for example) can be used with the same results. Derivations are straight forward and no further assumptions are made.

The resonant circuit may be transformed to its parallel equivalent at resonance by:

$$R_{21} = (R_s^2 + \omega^2 L^2/R_s) \quad (2)$$

$$\omega_r = \sqrt{(1/LC) - (R_s^2/L^2)} \quad (3)$$

$\omega$ is defined as usual with $\omega = 2\pi f$, with $\omega_r$ being the frequency at resonance.

The amplifier 12, with negative feedback through $R_{23}$ and $R_{24}$ and positive feedback through $R_{22}$ has negative resistive input impedance of magnitude:

$$(R_{22}\,\beta/1 - \beta) \quad (4)$$

Oscillation will occur when the inequality:

$$(R_{22}\ 62\ /1 - \beta)\ \leq\ R_{21}\ \text{holds.} \quad (5)$$

Equation (5) thus defines the "trip" point at which oscillations commence.

Since neither $R_{22}$ nor $\beta$ are functions of $\omega$ over the range of interest, it would be convenient to drop $\omega$ from equation (2) at least directly. Using the conventional definition of Q; $Q = (\omega L/R_s)$, we get:

$$R_{21} = \sqrt{(L/C)} \cdot \sqrt{Q^2 + 1} \quad (6)$$

and the simplified approximation:

$$R_{21} = (L/R_sC)\ \text{at resonance, if Q is large.} \quad (7)$$

which will be useful later.

Merely by way of example, assume that the target 31 is conductive and removed at a considerable distance from the probe 14. $R_{22}$ may now be adjusted so that the inequality (5) holds and oscillations occur. Now if the target is moved into the magnetic field produced by the probe 14 by the alternating current through the inductor 18, circulating currents are induced in the target causing $R_s$ to increase and to a lesser extent L to decrease. As follows from equation (7), $R_{21}$ then decreases, and at a precise point, $R_{21}$ becomes less than $(R_{22}\beta/1 - \beta)$, and oscillations cease. $\beta$ here is fixed by precision resistors, so that adjusting $R_{22}$ governs the left side of the inequality (5). The construction of the probe and the distance to the target determine $R_s$ and thus $R_{21}$ by equations (2), (3), (6) and (7). Consequently the distance from probe to target governs the inequality (5). As the target is withdrawn, $R_s$ decreases and the inequality (5) again holds and oscillations resume. All the equations hold for both the target approaching or withdrawing and the distance at which oscillations cease or resume is the same with only a very small theoretical error due to the amplifier 12 having a finite gain. Differential analysis and laboratory experiments confirm the following table of uncertainties for a two-inch diameter sensor at a probe-to-target distance D and uncertainty ΔD in inches.

| D | ΔD |
|---|---|
| 1.400" | 0.008" |
| 1.200 | 0.003 |
| 1.000 | 0.0013 |
| 0.800 | 0.0005 |
| 0.600 | 0.0002 |
| 0.400 | 80 millionths |
| 0.200 | 35 millionths |
| 0.100 | 20 millionths |

The above analysis was carried out with means 16 removed. We wish to show that this is permissible. First assume that the inequality (5) holds. Oscillations will build up appearing at terminal 25, and will increase in amplitude until limited by the amplifier 12, its supply voltages and diodes 43 and 42. This large amplitude AC is coupled by a capacitor 84 to a peak-to-peak diode detector, consisting of diodes 81 and 82, capacitors 85 and 84 and resistor 83. The rectified voltage from this detector is connected directly to the base of the transistor 88 and strongly reverse biases it. With transistor 88 cut off, no current can flow through transistor 89 and the collector terminal of transistor 89 presents a very high impedance to ground; typically many hundred megohms paralleled by a few picofarads. Consequently the presence or absence of the connection from the collector of transistor 89 to the bridge terminal 27 has no appreciable effect as long as inequality (5) is satisfied.

However, if for example the target 31 moves close to the proximity probe 14, the inequality (5) is not satisfied, and oscillations will tend to cease. But in such an event, the voltage across the resistor 83 drops and transistor 88 is forward biased. As transistor 88 allows current to flow to the differential pair 89 and 90, this pair now functions as a non-inverting amplifier which supplies energy to the resonant circuit $R_{21}$ to make up in its place the extra losses induced in probe 18 by eddy currents coupled to the target 31. By suitable choice of the resistor 91, the energy delivered by the means 16 to the resonant circuit may be limited so that in the event of probe damage, cable failures or other failures lowering the Q of the resonant circuit below a resonable minimum, oscillations will cease altogether.

The variable resistor bridge arm 22 may be varied to establish a variable trip point at which a conductive target will change the state of the output circuit 17. FIG. 2B illustrates this variable trip point in a curve 130. Merely by way of example, the target 31 may be moved toward the probe 14 to a distance 0.2 inches from the proximity probe 14. This would be a trip point 131. The eddy current losses in the conductive target will load the parallel resonant circuit 18–19 and lower the Q thereof so that the potential of the bridge terminal 27 is lowered, relative to ground, compared to what it would be if the target were removed. Variable bridge arm 22 may then be adjusted by the potentiometer 35 to increase the resistance thereof so that the amplifier 12 changes from full oscillation to a low level output. This will then establish the trip point. This means that the output means 17 has changed state to a GO condition. As described below this means there is an output at the main output terminal 105. Now if the target 31 is moved away from the probe 14, the Q of the parallel resonant will increase, the voltage across the first bridge arm 21 will increase and this places a positive feedback on the amplifier positive input terminal 29 so that the amplifier again goes to a full oscillation output condition. This change is passed to the output means 17 which changes state from a GO condition to a NO GO condition. A third condition is when the oscillations fail completely as due to some fault such as the probe 14 being smashed, open-circuited or short-circuited. With no oscillation output, the detector means 15 detects this lack of output and the output means 17 changes to a NO GO condition. If a Truth Table were to be constructed then the output means 17 would indicate a GO condition with a target present, that is, closer than the trip point, and a NO GO condition whenever the target was removed beyond the trip point or whenever the oscillations failed.

Figure 2A:
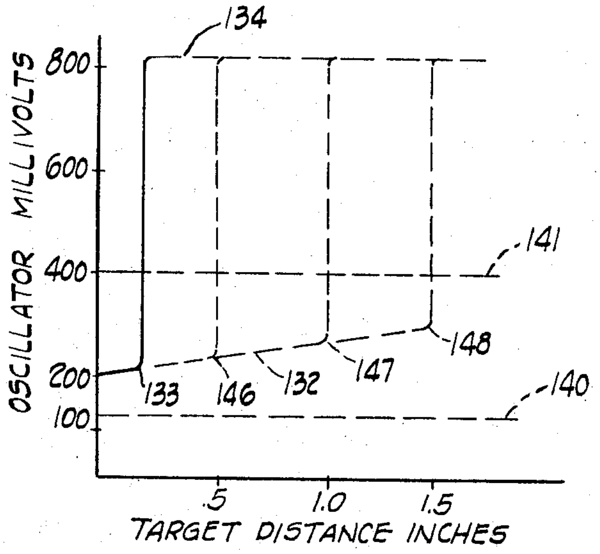
FIG. 2 is a graph of voltage versus target distance.
FIG. 2B is a graph of relative coil Q versus target distance.
Figure 2B:
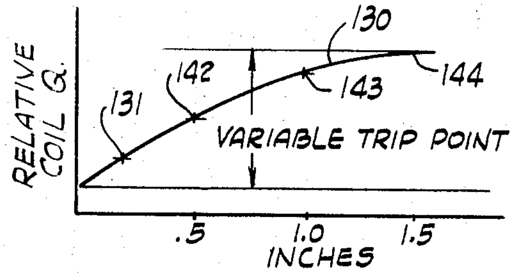

FIG. 2A illustrates what happens. As the target 31 moves away from the probe 14, the oscillations get stronger as illustrated by a curve 132. At the trip point 133, corresponding to trip point 131 of FIG. 2B, the oscillations abruptly become much stronger and grow to a level 134 which is limited only by the DC operating voltage and the amplifier 12. The output means 17 changes state as described below. The auxiliary detector 57 now supplies sufficient current through resistor 83 to completely turn off transistor 88. With the auxiliary energy pump 16 shut off and no longer needed to maintain oscillations of amplifier 12, these oscillations build up very rapidly to a value limited only by the DC supply voltage. In one actual circuit constructed according to the invention, this might be 800 millivolts as an example.

The time delay power supply 120 has a large capacitor 127 which charges rather slowly, for example, ¼ or ½ a second so that DC operating power is not supplied to the constant current generator 63 and 64 in the detector means 15 until the bridge 20 and amplifier 12 have settled down to steady state conditions. This is with the first turn on of the circuit 11.

The detector means 15 may be considered as a window detector with the first detector 55 detecting a lower threshold and the second detector 56 detecting an upper threshold operating condition. The bias means 72 sets these threshold operating conditions. The amplifier 12 has a DC output operating level determined by the input DC voltage. For example in one practical circuit made in accordance with the invention, the DC output voltage was 5.0 volts DC. The AC output oscillations are superimposed upon the DC operating level. Assume first that the circuit is energized but that the probe 14 is disconnected. This means no voltage across the first bridge arm 21 and hence there will be no oscillation output from the amplifier 12. Under such conditions the five volt DC output of the amplifier 12 establishes the condition of the output means 17. Resistor 75 in the bias means 72 is larger than resistor 74 and 76. With 5.0 volts DC at conductor 65, the 0.7 volts drop across diode 73 establishes the potential at terminal 136 at 4.3 volts. The potential on the base of transistor 59 will then be about 4.9 volts. This is a fixed bias whereas transistor 60 is self-biased through resistor 77. Since the base of transistor 60 is at 5.0 volts, this means that transistor 60 turns on and transistor 59 remains off. In the similar manner, transistor 61 is biased on by its self-bias through resistor 78 and transistor 62 is biased off by the 4.3 volts DC bias on its base.

The detector load resistor 71 is somewhat larger in value than detector load resistor 70. This means that with transistor 60 and 61 conducting fully, the potential at terminal 102 is pulled down to a lower value than that at terminal 101. In an actual circuit constructed according to the invention, this made the potential at terminal 101, 14.7 volts and the potential at terminal 102, 12.4 volts. This turns on transistor 98 and turns off transistor 97; hence there is no output at the main output terminal 105. There is a complementary output at the secondary output terminal 112. The light emitting diode 103 is dark indicating no output and hence this is the NO GO condition. This would be the case with amplifier failure, the probe coil 18 either short-circuited or open-circuited such as might occur because the probe had been smashed or damaged in some way or coolant or lubricant had leaked into the probe housing. Also this would be the case with a poor contact at the potentiometer 35 movable contact finger which would terminate the positive feedback.

Now assume that the target 31 is close to the probe 14, that is, within the trip point, and the probe is now connected to the circuit 11. With the target close, the probe voltage is low for a low level of oscillation output from amplifier 12. This low level of oscillation is sustained by the auxiliary energy pump 16, as explained above. This low level of oscillation makes the base of transistor 60 swing more or less positive with the positive and negative half cycles of the oscillation. Because the base of transistor 59 is partially bypassed to ground, the swing or excursion with the oscillator output is less on this base of transistor 59 than on the base of transistor 60. Accordingly during the negative half cycles of the oscillator output, the base of transistor 60 is driven more negative than the base of transistor 59 and this turns partly on the transistor 59. As tested in an actual circuit, this is about a 50% duty cycle for each of the transistors 59 and 60. This increases the current flow through the detector load resistor 70 and concurrently decreases the load current flow through detector load resistor 71. In the actual circuit, this made the potential at terminal 101, 13.1 volts and the potential at terminal 102, 15.2 volts relative to ground. This turns on transistor 97 and turns off transistor 98.

With transistor 97 on this provides an output on the main output terminal 105 as indicated by the light emitting diode 103. This is the GO condition showing that the target is in proximity to the probe 14, closer than the trip point.

If now the target is moved away from the probe 14, beyond the trip point such as trip point 131, 133, then as described above, the amplifier 12 has full oscillation output. The second detector 56 detects the fact that the knee of the curve at trip point 133 has been passed and the output means 17 changes state to a NO GO condition. The second detector 56 performs this function by the bias set by bias means 72. The base of transistor 62 is biased at a DC value of 4.3 volts in the example set forth above. This means that when the oscillator 12 has full output, these large excursions of AC signal will bias the base of transistor 62 on the negative half cycles such that it turns on partially for about a 50% duty cycle between transistor 61 and 62. This increases the current flow through detector load resistor 71 relative to the current through detector load resistor 70. This lowers the potential at terminal 102 and raises the potential at terminal 101. In the actual circuit constructed, this is a potential of about 14.7 volts at terminal 101 and 12.4 volts at terminal 102. This turns on transistor 98 and turns off transistor 97 to terminate the output at the main output terminal 105.

Figure 3:
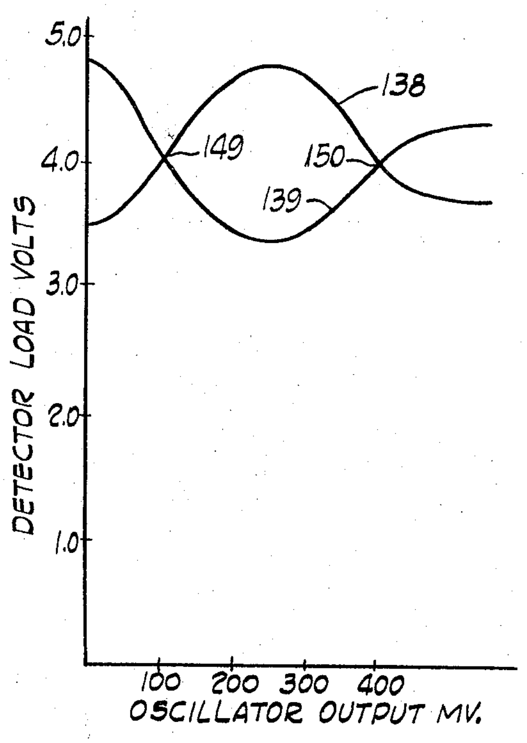
FIG. 3 is a graph of oscillator output versus detector volts.

FIG. 3 illustrates the changing voltages across the detector loads 70 and 71 in dependence on the AC millivolts input from the oscillator 12. Curve 138 shows the detector load volts across load resistor 70 and curve 139 shows the detector load volts across load resistor 71. In the above example the cross-over points are at 120 millivolts and 400 millivolts and this establishes the lower threshold operating condition 140 as shown on FIG. 2A and the upper threshold condition 141 also on FIG. 2A.

As explained above the trip point may be varied along curve 130 for example at points 142, 143 or 144, merely by changing the setting of the potentiometer 35. These different trip points will establish corresponding knees 146–148 of the curve of the oscillator output whereat the oscillator 12 goes into full oscillation.

In FIG. 3 the portion of the curve between the crossover points 149 and 150 is the GO condition and the area below the lower threshold at crossover 149 and the area above the upper threshold at crossover 150 are NO GO conditions.

If the proximity switch circuit is merely being used to count containers moving on a conveyor, then it may not matter whether one or two containers are missed out of 10,000. However, where a proximity switch circuit is being used as a replacement for an electromechanical limit switch in a machine tool and such proximity switch stops a machine tool slide 31 and reverses it, then failure can be very expensive if the machine is damaged or worse yet if a workman is injured. In such condition, a fail-safe operating condition is desired. The machine tool slide 31 must not be permitted to overtravel and the above-mentioned failure conditions will assure that a fail-safe condidtion of a NO GO output state will be provided by the proximity circuit of the present invention.

The above description has been based upon a conductive target. If a low-loss magnetically permeable target is used, then the output state is reversed for movements of a target on either side of a trip point. Such low loss magnetic materials may be any number of a zinc or manganese ceramics which are often called ferrites. Also, powdered iron may be used. With such a target, called herein a ferrite target, the magnetically permeable action exceeds the eddy current losses present in a conductive target even though it is magnetically permeable such as solid iron. $R_{21}$ as calculated from equations (2), (3), or (7) hence increases since the inductance of 18 increases more rapidly than $R_8$.

With a solid iron or conductive target, the potentiometer 35 may be set so that the amplifier oscillates fully with no target present. Then as the target approaches, $R_{21}$ decreases and at the trip point oscillations drop to a low level and output at terminal 105 commences. If the target is a ferrite target, the potentiometer 35 may be set so that the amplifier oscillates fully with a target present. As the target moves away past the trip point, oscillations drop to a low level sustained by the energy pump 16. In both cases the aforementioned fail-safe conditions prevail because the amplifier is oscillating at a low level during the time that the GO output condition on terminal 105 is established; and when oscillations cease or when they go to a full oscillating condition, this changes the output state to a NO GO condition.

The first and second output terminals 105 and 112 are provided and give complementary output states. A value of this is so that a twisted pair transmission line, for example, to a computer, may be supplied from terminals 105 and 112, with or without the relay 106 being present. Also the two complementary outputs 105 and 112 permit use of an exclusive OR gate connected to these terminals for noise rejection and. to guard against failures in the interconnection wiring of the customer which is connected to terminals 105 and 112.

The present invention has a proximity switch circuit which is considerably more sensitive than prior art circuits. The change of distance of the target to the probe to go around the knee of the curve 146–148, is considerably less than in the prior art. Typical values, for example, where the probe to target distance might be 1 inch, is that the change of distance for a change between GO and NO GO for the prior art might be 0.300 inches; whereas, the change of distance for the present invention is in the order of a few thousandths of an inch. This is a marked improvement over the prior art.

The reasons for such improvement is completely understood by reference to the preceding analysis.

The capacitor 19 has been shown as in the bridge 20 but it might also be placed physically inside the housing of the probe or part of such capacitor might be placed at such point. This would have the advantage of eliminating the circulating currents of the tank circuit from flowing through the conductors of the cable 40.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and scope of the invention as hereinafter claimed.

What is claimed is:

1. A proximity switch circuit comprising in combination, a main amplifier having an output and an input, a proximity probe, feedback means connecting said amplifier output to said amplifier input, means connecting said probe as part of said feedback means to produce a signal at said input of said amplifier which is variable in accordance with the distance from said probe to a conductive target, an auxiliary alternating current amplifier, means connecting said auxiliary amplifier as part of said feedback means to vary said main amplifier alternating current input, and detector means connected to detect reduced output of said main amplifier and connected to control said auxiliary amplifier to increase the alternating current output of said main amplifier.

2. A proximity switch circuit as set forth in claim 1, wherein said feedback means includes a bridge circuit having arms and an input and an output, and means connecting said bridge output to said main amplifier input.

3. A proximity switch circuit as set forth in claim 1, including inductive and capacitive means connected to be resonant at a given frequency, and means connecting said probe as part of said inductive and capacitive means.

4. A proximity switch circuit as set forth in claim 3, wherein said probe has a variable reactance as a part of one of said inductive and capacitive means.

5. A proximity switch circuit as set forth in claim 1, wherein said feedback means includes negative feedback means and positive feedback means each connected to the input of said main amplifier.

6. A proximity switch circuit as set forth in claim 5, wherein said feedback means includes a bridge circuit having four arms, means connecting said negative feedback means as two arms of said bridge circuit, and means connecting said positive feedback means as two remaining arms of said bridge circuit.

7. A proximity switch circuit as set forth in claim 1, wherein said feedback means includes positive feedback means, and said probe being connected in said positive feedback means.

8. A proximity switch circuit as set forth in claim 1, wherein said feedback means includes positive feedback means, and said auxiliary amplifier being connected in said positive feedback means.

9. A proximity switch circuit as set forth in claim 1, wherein said auxiliary amplifier has an output connected to said probe and has an input controlled by said detector means.

10. A proximity switch circuit as set forth in claim 1, including an output circuit connected to the output of said detector means, and bias means setting a threshold operating condition of said detector means to establish said detector means sensitive to outputs of said main amplifier less than said threshold to establish an output from said output circuit.

11. A proximity switch as set forth in claim 10, wherein said bias means establishes termination of the output from said output circuit upon output of said main amplifier being greater than said threshold.

12. A proximity switch as set forth in claim 1, including an output circuit connected to the output of said detector means, and bias means setting upper and lower threshold operating conditions of said detector means to establish said detector means sensitive to small outputs of said main amplifier between said upper and lower thresholds to establish an output from said output circuit and to establish termination of the output from said output circuit upon output of said main amplifier being either less than said lower threshold or greater than said upper threshold.

13. A proximity switch circuit as set forth in claim 12, wherein said feedback means includes negative and positive feedback means, and said probe being connected in said positive feedback means to establish oscillation of said main amplifier with a conductive target spaced from said probe a distance greater than a trip point.

14. A proximity switch circuit as set forth in claim 13, including means to vary the trip point at which there is a change detected by said detector means at said upper threshold.

15. A proximity switch as set forth in claim 1, wherein said detector means includes an auxiliary detector and first and second detectors, means connecting said auxiliary detector to control said auxiliary amplifier, bias means setting a lower threshold operating condition for said first detector and an upper threshold operating condition for said second detector, an output circuit connected to the output of said first and second detectors, and said lower and upper threshold operating conditions establishing a window with an output from said output circuit in accordance with said window.

16. A proximity switch as set forth in claim 15, wherein said lower and upper threshold operating conditions establish termination of an output from said output circuit for main amplifier outputs less than said lower threshold and greater than said upper threshold.

17. A proximity switch as set forth in claim 1, including an alternating and a direct current input to said main amplifier.

18. A proximity switch as set forth in claim 1, including in said feedback means an alternating current negative feedback.

19. A proximity switch as set forth in claim 1, including a direct current input to and output from said main amplifier, and means responsive to said direct current output to terminate alternating current output from said main amplifier upon alternating current input to said main amplifier being less than a given threshold.

* * * * *